July 4, 1950 J. L. RICHEY 2,513,362

APPARATUS FOR IMPROVING THE RECEPTION OF TELEGRAPH SIGNALS

Filed Sept. 19, 1945

Inventor

JOSEPH L. RICHEY

By Ralph L. Chappell

Attorney

Patented July 4, 1950

2,513,362

UNITED STATES PATENT OFFICE 2,513,362

APPARATUS FOR IMPROVING THE RECEPTION OF TELEGRAPH SIGNALS

Joseph L. Richey, United States Navy

Application September 19, 1945, Serial No. 617,402

6 Claims. (Cl. 250—8)

(Granted under the act of March 3, 1883, as amended April 30, 1928; 370 O. G. 757)

This invention relates in general to telegraph circuits and more particularly to radio telegraph circuits in which the virtual signal to noise ratio has been increased, enabling the operator to receive signals that he was unable to receive before the application of this invention.

In the older telegraph systems the circuits were designed so that current flowed in the line during the mark signal interval and the current ceased to flow during the space signal interval. Actually, noise currents flow during the space signal interval due to electrical disturbances in the transmission medium. In any given manual radio telegraph system the mark signal current flow must be strong enough so that the operator can distinguish the intelligence over the background noise. The ratio of mark to space current is generally referred to as the signal to noise ratio. This type of system is known as on-off keying.

In the more modern telegraph systems the signal to noise ratio has been improved by using frequency-shift keying. Frequency-shift keying consists in transmitting a continuous carrier wave of suitable frequency and changing this frequency between certain limits for the mark and space signals. In other words the carrier wave frequency is modulated by the telegraph signals. At the receiver, the frequency modulated carrier wave is reproduced and passed through a limiter to remove amplitude variations developed during transmission. The overall effect of the frequency shift keying is an increase in the virtual signal to noise ratio due to the removal of some of the disturbance by the limiter, and polar action.

This invention is concerned with an additional increase in the virtual signal to noise ratio for the two systems described above. It is not to be confused with other noise reducing apparatus such as the expander noise reducer employing elements such as varistors. This type of reducer may be cascaded with that of this invention to produce a maximum overall effect. This invention consists in deriving a bias voltage to vary the gain of the controlled amplifier and to reduce conduction in the amplifier during the space interval. By having little or no conduction in the controlled amplifier during the space interval the background noise is reduced, which results in an overall increase in the virtual signal to noise ratio, and enables the operator to receive border line signals that were very difficult to receive before.

It is an object of this invention to produce a system for increasing the virtual signal to noise ratio in a communication circuit.

Another object is to produce a system for increasing the virtual signal to noise ratio in a manually operated radio telegraph system.

Another object is to produce a system for increasing the virtual signal to noise ratio in on-off keying and frequency shifts keying radio telegraph circuits.

Another object is to produce a noise reduction system which will be economical to manufacture, reliable in operation and which possesses all of the qualities of ruggedness and dependability in serivec.

Figure 1:
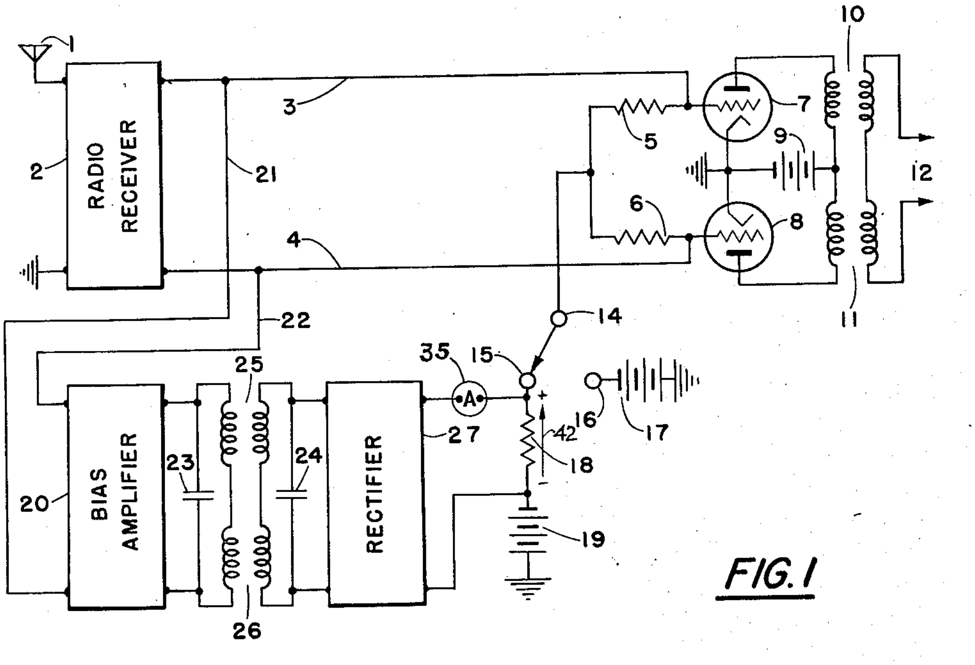
Figure 1 illustrates a circuit for increasing the virtual signal to noise ratio in a radio telegraph system using on-off keyed signals.

Referring to Figure 1, radio telegraph receiver 2 is connected to input antenna 1 and output leads 3 and 4. The output leads are connected to the grids of the controlled amplifier consisting of two triodes 7 and 8 in push-pull. Output transformers 10 and 11 combine the outputs from the separate tubes in one circuit 12 to operate a loudspeaker or any similar indicating device. Battery 9 furnishes the plate voltage for the two tubes.

To develop an operating bias for the controlled amplifier, leads 21 and 22 divert a portion of the output of receiver 2 to bias amplifier 20 for amplification. The amplified output from 20 passes through band pass filter 23 to 26 and rectifier 27, where it appears as a D. C. voltage across resistor 18, the direction of the current being shown by the arrow 42 whereby the switch contact 15 becomes sufficiently positive to overcome the cutoff bias furnished by battery 19 thereby permitting the tubes 7—8 to conduct. The D. C. voltage or bias voltage across 18 is fed to the grids 5 and 6 of the controlled amplifier through switch 14—15.

Battery 19 furnishes the bias to give the controlled amplifier a loss of amplification during the space signal when there is no voltage across resistor 18. To tune radio receiver 2 when this invention is utilized, switch arm 14 is moved to contact 16 which contact is furnished a bias by battery 17 for tuning purposes.

To operate the circuit of this invention, switch arm 14 is placed on contact 16 to supply the tuning bias and the radio receiver is tuned to the desired transmitting station. The beat frequency oscillator is adjusted to give a maximum reading on ammeter 35, this increases a receiver tone output of the frequency capable of passing through the center of the band pass filter 23 to 26. Switch arm 14 is now moved to contact 15 and battery 19 adjusted to provide a transmission loss in controlled amplifier 7—8 for the space or idle condition. The circuit is now ready for operation at a virtually increased signal to noise ratio, because the background noise of the space interval has been reduced by the reduced conduction in the controlled amplifier by the bias from battery 19. The overall effect is an increased virtual signal to noise ratio.

Figure 2:
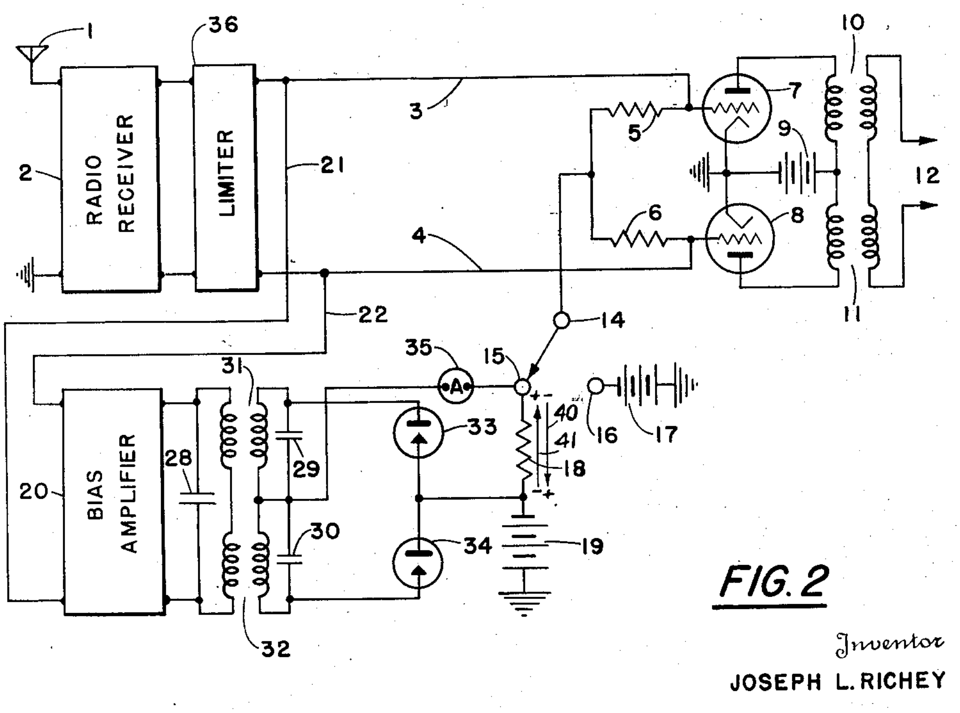
Figure 2 illustrates a circuit for increasing the virtual signal to noise ratio in a radio telegraph system using frequency-shift keyed signals.

Referring to Figure 2, radio telegraph receiver 2 is connected to input antenna 1 and output leads 3 and 4. The output leads of the receiver 2 are connected to limiter 36 which functions to give the frequency modulated carrier wave a constant amplitude. The output of the limiter is connected to the grids of the controlled amplifier, consisting of two triodes 7 and 8 in push-pull. Output transformers 10 and 11 combine the outputs from the separate tubes in one circuit 12 to operate a loudspeaker or any similar indicating device. Battery 9 furnishes the plate voltage for the two tubes.

To develop an operating bias for the controlled amplifier, leads 21 and 22 divert a portion of the output of receiver 2 to bias amplifier 20 for amplification. In frequency shift keying the frequencies for mark and space signals are generally approximately 850 cycles apart and the signals are usually placed in the 2000 to 3000 cycle range. Discriminator 28 to 34 has its primary 28—31—32 tuned to the midband frequency of 2550 cycles, where the mark frequency is 2125 cycles and the space frequency is 2975 cycles. The secondary of the discriminator has one section 29—31 tuned to the space frequency of 2975 cycles and the other section 30—32 tuned to the mark frequency of 2125 cycles. For a space signal frequency current will flow in tuned circuit 29—31, developing a voltage across condenser 29 which causes a direct current to flow through ammeter 35, resistance 18 and rectifier 33, the direction of the current flow being shown by the arrow 40. The direct current develops a voltage across resistor 18 such that the switch contact 15 becomes more negative than before. This negative potential at 15 is applied to grids 5 and 6 of the controlled amplifier, biasing tubes 7 and 8 to cut-off, thus introducing a loss in the circuit. This loss not only prevents the space signal frequency of 2975 cycles from being audible in the loudspeaker, it also prevents the normal background noise of the space signal from being audible in the loudspeaker. For a mark signal frequency current will flow in tuned circuit 30—32, developing a voltage across condenser 30 which causes a direct current to flow through rectifier 34, resistance 18, and ammeter 35, as is shown by the arrow 41. This direct current develops a voltage across resistor 18 such that the switch contact 15 becomes sufficiently positive to overcome the negative bias of the battery 19. This positive potential at 15 is applied to grids of the controlled amplifier, biasing tubes 7 and 8 for high gain, thus introducing a transmission gain in the circuit. This transmission gain causes the mark signal frequency of 2125 cycles to become audible in the loudspeaker of headset, thus enabling the operator to receive the code signals.

Battery 19 in this circuit furnishes a bias to adjust the developed bias across resistor 18 to the desired point on the characteristic curve.

To tune radio receiver 2 when this invention is utilized, switch arm 14 is moved to contact 16 which is furnished a bias by battery 17 for tuning purposes.

To operate the frequency shift circuit of this invention, switch arm 14 is placed on contact 16 to supply the tuning bias, and the radio receiver is tuned to the desired transmitting station. The beat frequency oscillator is adjusted to give a maximum reading on ammeter 35 while in the mark condition; this insures a receiver tone output of the mark frequency. Switch arm 14 is now moved to contact 15 and battery 19 adjusted until the developed bias across resistance 18 is operating on that point of the characteristic curve where the background noise of the space signal is a minimum. The circuit is now ready for operation at an increased virtual signal to noise ratio, because the background noise of the space signal has been materially reduced by the developed negative bias acting on the controlled amplifier to insert a transmission loss in the circuit during the space interval. The overall effect is an increased virtual signal to noise ratio.

The invention described herein may be made or used by or for the Government of the United States for governmental purposes without the payment to me of any royalties thereon or therefor.

What is claimed is:

1. Apparatus for receiving radio telegraph signals wherein the controlled amplifier functions to increase the virtual signal to noise ratio comprising, a radio receiver, a controlled amplifier directly receiving its input from the output of the radio receiver, a biasing amplifier also receiving its input from the output of the radio receiver, a band pass filter for selecting the mark signal current frequency from the output of the bias amplifier, a rectifier circuit for developing a grid voltage for the controlled amplifier to cause a transmission gain in the signal circuit for a mark signal and a battery for developing a grid voltage for the controlled amplifier to cause reduced conduction in the signal circuit for a space signal.

2. Apparatus for receiving radio telegraph signals wherein the controlled amplifier functions to increase the virtual signal to noise ratio comprising, a radio receiver, a controlled amplifier directly receiving its input from the output of the radio receiver, a biasing amplifier also receiving its input from the output of the radio receiver, a discriminator for segregating the mark and space signal currents from the output of the bias amplifier, a rectifier circuit included in the discriminator for developing a relatively low grid voltage impressible on the controlled amplifier circuit to cause a transmission gain in said signal circuit for a mark signal, and another rectifier circuit included in the discriminator for developing a relatively high grid voltage also impressible on the controlled amplifier circuit to cause reduced conduction in said signal circuit for a space signal.

3. In radio telegraph signalling apparatus, a receiver having conductor leads, a controlled amplifier to actuate an indicating device, said controlled amplifier including triodes at the grids of which the leads terminate, a unit source of direct current to impose a fixed negative bias on the grids of said triodes thereby to cause reduced conduction in the controlled amplifier circuit to denote space signals, and means to furnish an operating bias for the controlled amplifier comprising a bias amplifier connected to said leads to divert a portion of the receiver output, and filter and rectifier means serially connected with the bias amplifier and unit source of direct current to dominate said unit current source and thereby cause increased conduction in the controlled amplifier to denote mark signals.

4. In radio telegraph signalling apparatus, a receiver having conductor leads, a controlled amplifier to actuate an indicating device, said controlled amplifier including triodes at the grids of which the leads terminate, a bias amplifier connected to said leads to derive an operating bias therefrom by diversion of a portion of the receiver output, a discriminator connected to the bias amplifier and tuned to pass mark and space signals of dissimilar frequencies, and rectifier circuits connected with the discriminator said circuits embodying rectifier means impressing positive direct current on said grids to bias the triodes into conduction for a mark signal, and negative direct current on said grids to bias the triodes to cut-off for space signals.

5. Apparatus for receiving radio telegraph signals wherein a controlled amplifier functions to increase the virtual signal to noise ratio comprising, a receiver for successive mark and space radio telegraph signals, said receiver having conductor leads, a controlled amplifier consisting of a plurality of space discharge devices having at least an anode, cathode, and control grid, the said control grids being directly connected to the receiver conductor leads, a biasing amplifier also directly connected to the conductor leads, a bandpass filter connected to the output of the biasing amplifier for segregating the mark from the space signals, a rectifier means serially connected to the bandpass filter so as to produce a direct current indicative of the mark signals, and a unit source of direct current, also connected to said control grids for imposing a fixed negative bias on the controlled amplifier thereby reducing conduction to denote space signals, the rectified direct current dominating said unit source of direct current to cause increased conduction to denote mark signals.

6. Apparatus for receiving radio telegraph signals wherein a controlled amplifier functions to increase the virtual signal to noise ratio comprising a receiving means for successive mark and space telegraph signals, a controlled amplifier consisting of a plurality of space discharge devices having at least an anode, cathode, and control grid, the said receiving means being directly connected to the said control grids, a biasing amplifier also directly connected to the receiving means, a discriminator serially connected to the bias amplifier and tuned to pass mark and space signals of dissimilar frequencies, rectifier circuits connected with the discriminator and directly to said control grids of the controlled amplifier, said circuits embodying rectifier means for alternately impressing positive and negative direct currents on said control grids whereby the conduction of the controlled amplifier is increased or reduced as indicative of the mark or space signals.

JOSEPH L. RICHEY.

REFERENCES CITED

The following references are of record in the file of this patent:

UNITED STATES PATENTS

| Number | Name | Date |
|---|---|---|
| 1,795,393 | Herman | Mar. 10, 1931 |
| 2,283,404 | Wood | May 19, 1942 |
| 2,306,214 | Hanley | Dec. 22, 1942 |
| 2,356,390 | Finch | Aug. 22, 1944 |
| 2,362,958 | Sandretto | Nov. 14, 1944 |
| 2,370,216 | Worcester, Jr. | Feb. 27, 1945 |
| 2,373,495 | Olsen | Apr. 10, 1945 |
| 2,379,799 | Haigis | July 3, 1945 |
| 2,383,126 | Hollingsworth | Aug. 21, 1945 |
| 2,397,830 | Bailey | Apr. 2, 1946 |